(12) United States Patent
Han

(10) Patent No.: US 6,215,997 B1
(45) Date of Patent: Apr. 10, 2001

(54) TECHNIQUE FOR REPORTING FAULTS OF BASE STATION OF DIGITAL CELLULAR SYSTEM

(75) Inventor: Sung-Hwan Han, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 08/857,505

(22) Filed: May 16, 1997

(30) Foreign Application Priority Data

May 16, 1996 (KR) .................................................. 96-16383

(51) Int. Cl.[7] ...................................................... H04M 1/24
(52) U.S. Cl. ............................... 455/423; 379/1; 455/67.1
(58) Field of Search ....................... 455/423, 67.1, 455/67.7, 561, 410, 404, 422, 417, 63, 550, 455; 375/244, 248, 254, 346, 375; 379/1, 2

(56) References Cited

U.S. PATENT DOCUMENTS

| | | |
|---|---|---|
| 5,351,247 | 9/1994 | Dow et al. . |
| 5,454,024 | 9/1995 | Lebowitz . |
| 5,471,649 * | 11/1995 | Rees et al. ............................ 455/423 |
| 5,481,539 | 1/1996 | Hershey et al. . |
| 5,487,176 * | 1/1996 | Yoneyama ........................... 455/67.7 |
| 5,500,944 | 3/1996 | Yoshida . |
| 5,513,189 | 4/1996 | Savage . |
| 5,521,904 * | 5/1996 | Eriksson et al. ..................... 455/423 |
| 5,528,516 | 6/1996 | Yemini et al. . |
| 5,572,510 * | 11/1996 | Koivu .................................. 455/423 |
| 5,621,753 | 4/1997 | Weber . |
| 5,706,333 * | 1/1998 | Grenning et al. .................... 455/423 |
| 5,805,666 * | 9/1998 | Ishizuka et al. ......................... 379/1 |
| 5,805,982 * | 9/1998 | Hulsebosch ............................ 455/62 |
| 5,844,899 * | 12/1998 | Daley et al. .......................... 370/342 |
| 5,854,786 * | 12/1998 | Henderson et al. .................. 370/335 |

* cited by examiner

Primary Examiner—Edward F. Urban
Assistant Examiner—Congvan Tran
(74) Attorney, Agent, or Firm—Robert E. Bushnell, Esq.

(57) ABSTRACT

A technique for reporting faults of a base station in a digital cellular system, includes: a base station management unit having a table storing information of predetermined faults; and a base station including multiple devices, which detects the faults of the devices and reports addresses for accessing relevant fault messages of the table to the base station management unit.

5 Claims, 3 Drawing Sheets

| KIND OF FAULT | FAULT MESSAGE |
|---|---|
| FAULT 1 | 0000000000000000 |
| FAULT 2 | 0000000000000001 |
| FAULT 3 | 0000000000000010 |
| FAULT 4 | 0000000000000011 |
| FAULT 5 | 0000000000000100 |
| ... | ... |
| FAULT 11279 | 1111111111111110 |
| FAULT 11280 | 1111111111111111 |

Fig. 3B

| KIND OF FAULT | FAULT MESSAGE |
|---|---|
| FAULT 1 | 0000000000000000 |
| FAULT 2 | 0000000000000001 |
| FAULT 3 | 0000000000000010 |
| FAULT 4 | 0000000000000011 |
| FAULT 5 | 0000000000000100 |
| ... | ... |
| FAULT 11279 | 1111111111111110 |
| FAULT 11280 | 1111111111111111 |

Fig. 3A

TECHNIQUE FOR REPORTING FAULTS OF BASE STATION OF DIGITAL CELLULAR SYSTEM

CLAIM OF PRIORITY

This application makes reference to, incorporates the same herein, and claims all benefits accruing under 35 U.S.C. §119 from an application for DEVICE AND METHOD OF NOTIFYING FAULT OF BASE STATION OF DIGITAL CELLULAR SYSTEM earlier filed in the Korean Industrial Property Office on the 16th day of May 1996 and there duly assigned Ser. No. 16383/1996, a copy of which application is annexed hereto.

BACKGROUND OF THE INVENTION

1. Field of the Invention

This invention relates to a technique for reporting faults of a base station of a digital cellular system to an upper base station management unit. Specifically, this invention is a technique for reporting the faults of the base station with a message whose length is reduced.

2. Description of the Related Art

A digital cellular system, which is a code division multiple access communication system, is composed of a base station subsystem (BSS), a mobile switching center (MSC), and a home location register (HLR). A BSS consists of a base station management unit (BSM), multiple base station controllers (BSC), and multiple base station transceiver subsystems (BTS).

The system contains one BSM which is composed of work stations. BSM loads a call control processor (CCP). The BBS is equipped with a maximum of twelve CCPs. One CCP can load a maximum of thirty-two selector interface processors (SIP) and a maximum of sixteen BTS control processors (BCP). The BSS is equipped with a maximum of three hundred eighty four SIPs. One SIP can load a maximum of four selector vocoder processors (SVP). The BSS is equipped with a maximum of one hundred ninety two BCPs. One PCP loads a maximum of twenty four control interworking processors (CIP), one BTS test processor (BTP), six pairs of transceiver interface processors (TIP), and one pair of time and frequency processors (TFP).

Each BTS of the digital cellular system has a function of reporting the faults of its own devices to the BSM. There are 130 kinds of faults which can occur in a BTS. There are 11280 kinds of faults, when considering which device has what kind of a fault. The number of devices where 120 kinds of faults can occur is 30. The number of devices where the remaining 10 kinds of faults can occur is 768. Therefore, the following formula is established. 120×30+10×768=11280. The numbers 120 and 10 indicate the number of kinds of faults, and numbers 30 and 768 indicate the number of devices which are called locations.

A fault message which the BTS sends to the BSM is composed of 9 bytes. Four bytes of nine bytes indicate a kind of the fault, and another four bytes indicate a location. The remaining one byte indicates a state of a fault. When it is assumed that all cases of the faults which can occur in one BTS occur, a total length of the fault messages sent to the BSM is 101520 bytes (812160 bits). That is, 9×11280= 101520.

This messages indicating faults of the BTS cannot all be sent to the BSM at one time because the length of the messages is limited to 128 bytes when the BTS communicates with BSM, and the data area is limited to 112 bytes. Therefore, when it is assumed that all cases of the faults which can .occur in one BTS occur, the BTS must send the messages to the BSM about 907 (=101520/112) times. It takes a long time to inform the BSM of faults of the BTS so that it also takes a long time to process the faults.

The following patents each disclose features in common with the present invention but do not teach or suggest the specifically recited technique for reporting faults of the base station with a reduced message length as in the present invention.

U.S. Pat. No. 5,513,189 to Savage, entitled Boundary Scan System With Improved Error Reporting Using Sentinel Bit Patterns, U.S. Pat. No. 5,528,516 to Yemini et al., entitled Apparatus And Method For Event Correlation And Problem Reporting, U.S. Pat. No. 5,351,247 to Dow et al., entitled Fault Identification System, U.S. Pat. No. 5,500,944 to Yoshida, entitled Fault Indication System In A Centralized Monitoring System, U.S. Pat. No. 5,481,539 to Hershey et al., entitled Datagram Communication Service Over A Cellular Telephone Network, U.S. Pat. No. 5,454,024 to Lebowitz, entitled Cellular Digital Packet Data (CDPD) Network Transmission System Incorporating Cellular Link Integrity Monitoring, and U.S. Pat. No. 5,621,753 to Weber, entitled Digital Communication System And A Primary Station For Use In Such A System.

SUMMARY OF THE INVENTION

An object of the present invention is to provide a technique for reporting faults occurring in a base station to a base station management unit more quickly.

Another object of the present invention is to provide a fault reporting technique making it possible to process the faults of the base station more quickly.

To achieve the objects of the present invention, there is provided a method of reporting the faults more quickly by reducing the length of the messages indicating the faults of the base station.

A technique for reporting faults of a base station in a digital cellular system, includes: a base station management unit having a table storing information of predetermined faults; and a base station including multiple devices, which detects the faults of the devices and reports addresses for accessing relevant fault messages of the table to the base station management unit.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings, in which like reference symbols indicate the same or similar components, wherein:

FIGS. 3A and 3B illustrate structures of fault tables, constructed in the base station and base station management, respectively, for an operation according to the present invention.

DETAILED DESCRIPTION OF THE PREFERRED EMBODIMENT(S)

With reference to the attached drawings, a preferred embodiment of the present invention is described below in detail.

Where concrete explanation of obvious functions or configurations, may blur the point of this invention, a detailed description thereof has been omitted. Terms used in the following description are defined in the conception of the present invention. These terms can be different depending on the intention or convention of users or inventor, so that the definition of these terms must be based on the overall content of this specification.

Figure 1:
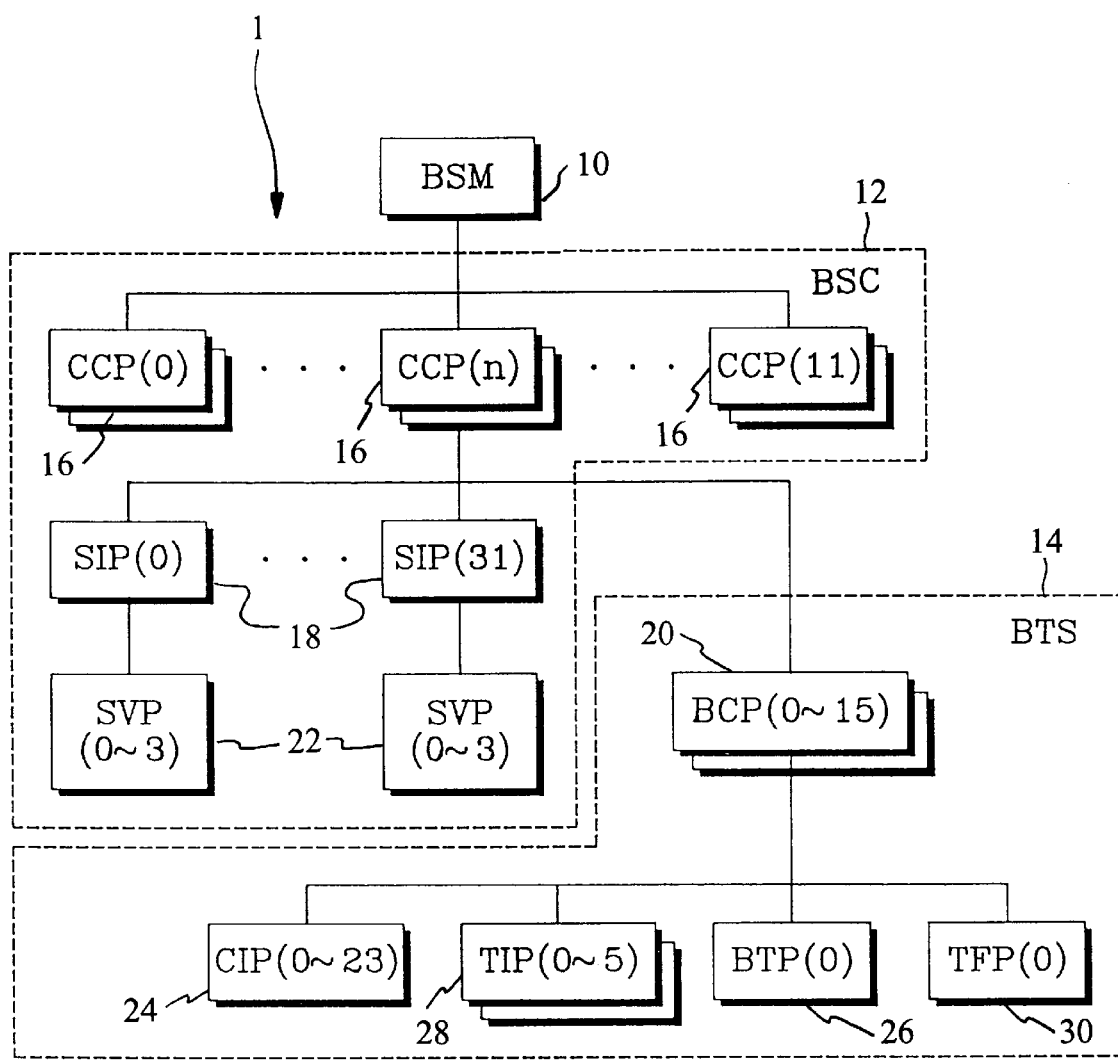
FIG. 1 illustrates a configuration of a digital cellular system.

FIG. 1 shows the hierarchical processor arrangement for digital cellular system used as a code division multi-access communication system. A digital cellular system may be constructed with a base station 1 (BSS), a mobile switching center (MSC) (not shown), and a home location register (HLR) (not shown). As shown in FIG. 1, base station 1 may be constructed with a base station manager 10 (BSM), a base station controller 12 (BSC), and a base station transceiver subsystem 14 (BTS). Typically, a digital cellular system contains one BSM 10 which is composed of work stations (not shown). The BSM loads call control processors 16 (CCPs). The BSC 12 is equipped with a maximum of twelve CCPs 16. One CCP 16 can load a maximum of thirty-two selector interface processors 18 (SIPs) and a maximum of sixteen BTS control processors 20 (BCPs). Therefore the BSS 1 is equipped with a maximum of three hundred eighty four SIPs 18. One SIP 18 can load a maximum of four selector vocoder processors 22 (SVP). The BSS 1 is equipped with a maximum of one hundred ninety two BCPs 20. One BCP 20 loads a maximum of twenty four control inter-working processors 24 (CIP), one BTS test processor 26 (BTP), six pairs of transceiver interface processors 28 (TIP), and one pair of time and frequency processors 30 (TFP).

FIG. 1 also illustrates a loading operation executed in BSS of a digital cellular system. The BSS has a hierarchical structure made up of upper, intermediate, and lower processors. An intermediate processor, such as a CCP 16, an SIP 18, or a BCP 20, receives its programs and data from an upper processor, such as a BSM 10 or a CCP 16, through a loading operation. The intermediate processor also stores programs and data which are loaded from an upper processor and loads them into low processors during the execution of an application. If a lower processor requires loading by an intermediate processor, the intermediate processor receives and stores the program or data and then loads it into the lower processor. Note an intermediate processor such as a CCP 16 may play the role of an upper processor for processors on lower levels of the hierarchical structure, and it may also play the role of a lower processor with respect to processors on a higher level of the hierarchy.

This information transfer is established through physical communication channels, and as a consequence external interference or other factors can cause information losses or errors in the loading operation.

Figure 2:
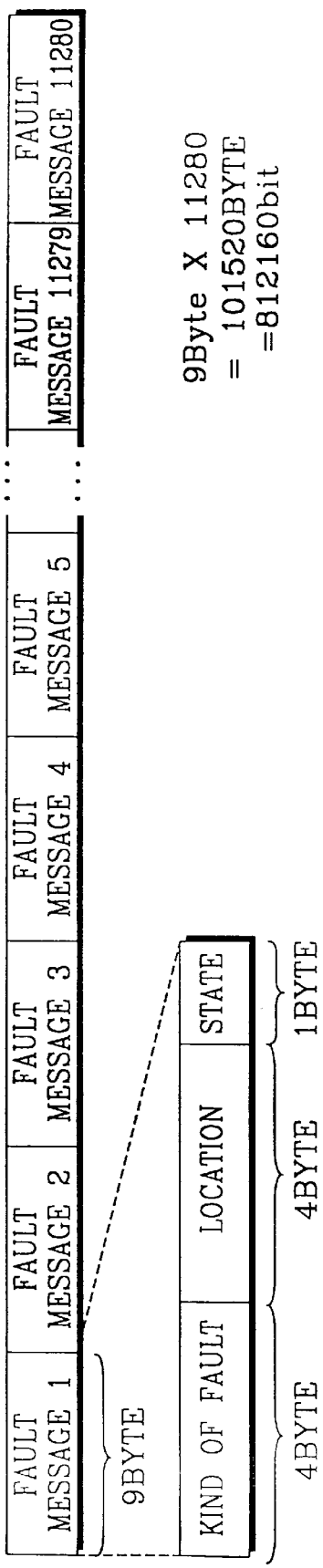
FIG. 2 illustrates an earlier format of fault messages sent from a base station, while processing the faults of the base station.

FIG. 2 illustrates the format of an earlier fault message.

As shown in FIG. 3A, a fault table constructed in a base station has the first area for storing information of all cases of faults which can occur in the internal devices of the base station, that is, the information on what kinds of faults they are, and the second area for storing fault messages.

As shown in FIG. 3B, a fault table constructed in the BSM has the first area made of multiple addresses and the second area for storing information of each fault corresponding to the addresses of the address area.

The information about all cases of faults which can occur in the internal devices of the base station, is commonly stored in the first area of the base station fault table and the second area of the BSM fault table. The addresses making up the first area of BSM fault table is stored in the second area of base station fault table in a form of the fault messages.

Figure 4:
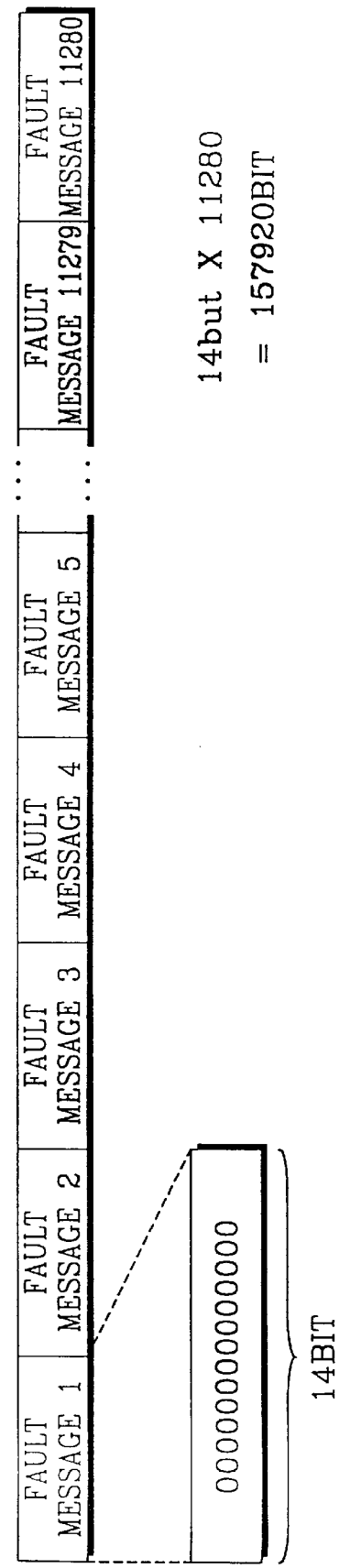
FIG. 4 illustrates a format of fault messages sent from the base station, while processing the faults of the base station according to the present invention.

If faults occur in all the devices of the base station, the base station detects the faults by checking its fault table and sends fault messages indicating the kinds of faults to the BSM after reading them from the second area. Each fault message sent to the BSM is an address capable of accessing the first area of the BSM fault table, as shown in FIG. 4. When a number of faults which can occur in the devices of the base station is 11280, 14 bits are sufficient to represent the messages corresponding to faults because $2^{14}=20384$. The fault messages which the base station sends to the BSM according to the present invention is shorter than that of the earlier techniques. In the earlier techniques, the length of the fault message is 72 bits, that is, 9 bytes. In contrast, the length of the fault message according to the present invention is reduced to 14 bits. When faults occur in all the devices of the base station, and the base station reports the faults to the BSM, the base station of the earlier technique sends a fault message of 9 bytes×11280=101520 bytes= 812160 bits, as shown in FIG. 2. As shown in FIG. 4, however, the base station according to the present invention sends the fault messages of 14 bits×11280=157920 bits. It is clear that the length of the fault messages of the present invention is reduced.

Briefly speaking, a base station and the BSM of the present invention have predetermined fault tables, and the base station reports addresses which are capable of accessing the fault table of the BSM when a fault occurs. Accordingly, the quantity of information to be sent by the base station is reduced, thereby informing the BSM of the base station fault and processing the fault more quickly.

It should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. In a digital cellular system (DCS) with the capability to detect a faulty cellular communications device (CCD) in use in the system, said DCS comprising:

at least one CCD;

a base station subsystem (BSS);

a base station management unit (BSMU) for managing operations of the BSS, said BSMU comprising:

a memory storing information concerning predetermined faults; and a base station controller (BSC) for controlling multiple devices in a hierarchical fashion; and a base station transceiver system (BSTS) for communicating information regarding a faulty CCD to the BSMU;

the improvement comprising:

a portion of said memory storing said information concerning predetermined faults, said information concerning predetermined faults constituting data concerning selected ones of said predetermined faults, stored at distinct addresses corresponding to respective ones of said predetermined faults, said information concerning predetermined faults not containing measurements of parameters of signals transmitted by the base station and CCDs; and a means for detecting faults of said BSC and devices of said BSC and for reporting corresponding ones of said distinct addresses to enable said BSMU to access fault messages corresponding to said addresses from said information concerning said predetermined faults.

2. The DCS of claim 1, wherein said BSMU comprises a plurality of call control processors, each of said call control processors being capable of producing a corresponding one of said predetermined faults, each of said call control processors comprising a plurality of selector interface processors, and each of said selector interface processors being capable of producing a corresponding one of said predetermined faults, each selector interface processor comprising a plurality of selector vocoder-processors, each of said selector vocoder-processors being capable of producing a corresponding one of said predetermined faults.

3. The DCS of claim 2, wherein said BSC is attached to a BSTS wherein each call control processor is attached to a plurality of BSTS control processors and each of said BSTS control processors is attached to BSTS test processor, a time and frequency processor, a plurality of transceiver interface processors, and a plurality of control inter-working processors, each potentially producing one of said predetermined faults addressed by said BSMU.

4. The DCS of claim 2, with said memory of said DCS having a table storing information about faults likely to occur in any of the devices, and identifying devices producing said faults likely to occur by checking the table.

5. A method for detecting a faulty cellular communications device (CCD) in use in a base station of a digital cellular system (DDS), said DCS comprising:

at least one CCD;

a base station subsystem (BSS);

a base station management unit (BSMU) for managing operations of the BSS, said BSMU comprising:
a memory storing information concerning predetermined faults; and
a base station controller (BSC) for controlling multiple devices in a hierarchical fashion; and a base station transceiver system (BSTS) for communicating information regarding a faulty CCD to the BSMU;

said method comprising the steps of:
storing in said memory information concerning said predetermined faults, said information concerning predetermined faults constituting data concerning selected ones of said predetermined faults, stored at distinct addresses corresponding to respective ones of said predetermined faults, said information concerning predetermined faults not containing measurements of parameters of signals transmitted by the base station and CCDs;

detecting faults of said BSC and devices of said BSC; and reporting corresponding ones of said distinct addresses to enable said BMSU to access fault messages corresponding to said addresses from said information concerning predetermined faults.

* * * * *